US012272511B1

(12) United States Patent
Bond, III et al.

(10) Patent No.: US 12,272,511 B1
(45) Date of Patent: Apr. 8, 2025

(54) MULTI-MATERIAL THERMIONIC ELECTRON EMITTERS

(71) Applicant: EngeniusMicro, LLC, Huntsville, AL (US)

(72) Inventors: Arthur Gernt Bond, III, Auburn, AL (US); Benoit Hamelin, Atlanta, GA (US)

(73) Assignee: EngeniusMicro, LLC, Huntsville, AL (US)

( * ) Notice: Subject to any disclaimer, the term of this patent is extended or adjusted under 35 U.S.C. 154(b) by 0 days.

(21) Appl. No.: 18/791,792

(22) Filed: Aug. 1, 2024

Related U.S. Application Data

(63) Continuation of application No. 18/404,139, filed on Jan. 4, 2024, now Pat. No. 12,080,505.

(60) Provisional application No. 63/478,419, filed on Jan. 4, 2023.

(51) Int. Cl.
*H01J 1/16* (2006.01)
*H01J 1/14* (2006.01)

(52) U.S. Cl.
CPC . *H01J 1/16* (2013.01); *H01J 1/14* (2013.01)

(58) Field of Classification Search
CPC ..................................... H01J 1/16; H01J 1/14
See application file for complete search history.

(56) References Cited

U.S. PATENT DOCUMENTS 5,493,177 A * 2/1996 Muller ...................... H01J 9/02 313/578

* cited by examiner

*Primary Examiner* — Anne M Hines
(74) *Attorney, Agent, or Firm* — Morris, Manning & Martin, LLP; Daniel E. Sineway, Esq.; Daniel Begasse, Esq.

(57) ABSTRACT

The present disclosure can relate to a thermionic emission device. The thermionic emission device can include a substrate layer, an insulating layer deposited onto an uppermost surface of the substrate layer, and an electron emitting layer deposited onto an uppermost surface of the insulating layer. The electron emitting layer, the insulating layer, and the substrate layer each can include a first etching and a second etching oriented according to a photoresist pattern applied to an uppermost surface of the electron emitting layer. The first etching and the second etching can converge to form a cavity in the substrate layer beneath a beam suspended above the cavity. The beam can comprise an unetched region of the electron emitting layer and the insulating layer oriented between the first etching and the second etching.

20 Claims, 4 Drawing Sheets

MULTI-MATERIAL THERMIONIC ELECTRON EMITTERS

CROSS-REFERENCE TO RELATED APPLICATIONS

This application is continuation patent application of, and claims the benefit of and priority to, U.S. Non-Provisional patent application Ser. No. 18/404,139, filed on Jan. 4, 2024, and entitled "MULTI-MATERIAL THERMIONIC ELECTRON EMITTERS," which claims the benefit of and priority to U.S. Provisional Patent Application No. 63/478,419, filed on Jan. 4, 2023, and entitled "APPARATUSES, SYSTEMS, AND METHODS FOR MINIATURIZING HIGH-BRIGHTNESS THERMIONIC ELECTRON EMITTERS," the disclosures of which are incorporated by reference in their entireties as if the same were fully set forth herein.

STATEMENT REGARDING FEDERALLY SPONSORED RESEARCH

This invention was made with government support under the Navy SBIR contract N6833522C0096. The government has certain rights in the invention.

TECHNICAL FIELD

The present apparatuses, devices, and processes generally relate to the miniaturization of high-brightness thermionic electron emitters and, more specifically, to the stress compensation and electrical and thermal isolation of suspended multi-layered thermionic emitters.

BACKGROUND

Thermionic emitters, or thermionic electron emitters, are materials that release electrons in response to being heated to a certain temperature. A primary issue with conventional thermionic emitters is their reliability, namely with respect to their tendencies to twist, crack, and break when manufactured as electrodes or nanowires. Conventional thermionic emitters also typically include materials with mismatched coefficients of thermal expansions (CTE) and stress gradients. These issues with conventional thermionic emitters can also thermally damage a substrate supporting the thermionic emitters.

Therefore, there is a long-felt but unresolved need for a system or method to form multi-material thermionic electron emitters that have low-residual stress, are thermally matched with and thermally isolated from the supporting substrate, and simultaneously exhibit anisotropic emission of electrons.

BRIEF SUMMARY OF THE DISCLOSURE

Briefly described and according to one example, aspects of the present disclosure generally relate to multi-layered thermionic electron emitters, and more specifically to thermionic electron emitters fabricated with multiple material layers that are CTE-matched to structurally support an electron emitting layer and further compensate for stresses within the multi-layered thermionic electron emitters (such as thermal stress, residual stress, tensile stress, and other stresses). The disclosed system can include a multi-layer thermionic electron emitter. The multi-layer thermionic electron emitter can include a material stack. For example, the material stack can include at least a low-work function material (also referred to herein as a low-work function layer), an insulating material (also referred to herein as an insulating layer), and a substrate. The low-work function material can operate at a target temperature and perform a thermionic emission of electrons. The insulating material can support the low-work function material and include material properties that enhance the thermionic emission of electrons and increase the structural integrity of the multi-layer thermionic electron emitters. The substrate can function as a mechanical support system for the low-work function material and the insulating material.

The material stack of the multi-layered thermionic electron emitter can include the low-work function material fabricated (for example, via a film deposition process) onto an uppermost surface of the insulating material. The insulating material can be fabricated onto an uppermost surface of the substrate. The substrate and portions of the low-work function material and the insulating material can be patterned to form a cavity and one or more beams. The beams can include the low-work function material and the insulating material suspended across the cavity formed into the substrate. The beam can function as a segment of the low-work material and the insulating material that extends continuously across the uppermost surface of the substrate and across the cavity formed in the substrate. The beam can be suspended across the cavity in the substrate to achieve a target temperature difference between the low-work function material and the substrate. For example, by suspending the beam over the cavity, the low-work function material can exhibit greater thermal isolation and increase the thermal difference between the low-work function and the substrate. The insulating material can provide structural integrity as the low-work material and the insulating material extends across the cavity.

The insulating material can be selected for its electrical and thermal insulation capabilities, and for exhibiting a melting point higher than that of the low-work function material. For example, the insulating material can be selected for its processing compatibilities, including high selectivity during releasing. The insulating material can include a CTE that compensates for the CTE mismatch between the low-work function material and the supporting substrate. By including similar CTE values between the substrate and the insulating material, the insulating material can provide structural integrity to the low-work function material when operating at the target temperature.

The thickness of the insulating material can be a particular thickness that is optimal for compensating for the CTE mismatch stress in the low-work function material at the target temperature of operation. For example, the thickness of the insulating material can be varied such that the insulating material provides enough support to the low-work function material to accommodate for CTE mismatch stresses.

The low-work function material is patterned to achieve the target temperature of operation. For example, the low-work function material can be patterned to create a particular beam design. The particular beam design can define one or more particular lengths, thicknesses, depths, and/or shapes of the beam. The temperature of operation can vary linearly with variations to the particular beam design. The particular beam design can be patterned into the low-work function material to achieve a desired target temperature of operation.

A top side (or surface) of the multi-layered thermionic electron emitter can emit electrons at the target temperature of operation. For example, the insulating material can limit (or prevent entirely) electron emission towards the insulating material and the substrate. The insulating material can limit electron emission from a bottom side (or surface) of the low-work function material toward the substrate. By limiting or preventing electron emission in the direction of the substrate, the insulating material can reduce the negative space charge (NSC) effect and increase the flux of emitted electrons.

In various examples, independent multi-layered thermionic electron emitters of varying dimensions are fabricated in an array to circumvent the failure of any one multi-layered thermionic electron emitter. For example, one or more beams can be patterned into one or more multi-layered thermionic electron emitters on a single die (e.g., substrate) to circumvent the failure of any one of the beams in the multi-layered thermionic electron emitter.

According to a first aspect, a thermionic emission device, comprising: A) a substrate layer; B) an insulating layer deposited onto an uppermost surface of the substrate layer; and C) an electron emitting layer deposited onto an uppermost surface of the insulating layer, wherein the electron emitting layer, the insulating layer, and the substrate layer each comprise a first etching and a second etching oriented according to a photoresist pattern applied to an uppermost surface of the electron emitting layer, wherein the first etching and the second etching converge to form a cavity in the substrate layer beneath a beam suspended above the cavity, wherein the beam comprises an unetched region of the electron emitting layer and the insulating layer oriented between the first etching and the second etching.

According to a further aspect, the thermionic emission device of the first aspect or any other aspect, wherein the first etching and the second etching are isotropically etched.

According to a further aspect, the thermionic emission device of the first aspect or any other aspect, wherein the electron emitting layer comprises a polycrystalline-structured low work function material.

According to a further aspect, the thermionic emission device of the first aspect or any other aspect, wherein in response to a particular voltage being applied to opposing ends of the beam, the electron emitting layer along the unetched region is configured to emit electrons in response to reaching an energy threshold corresponding to the low work function material.

According to a further aspect, the thermionic emission device of the first aspect or any other aspect, wherein emitting electrons in response to reaching the energy threshold corresponding to the low work function material comprises anisotropic emission of electrons directed away from both the insulating layer and the substrate layer.

According to a further aspect, the thermionic emission device of the first aspect or any other aspect, wherein the insulating layer comprises a predetermined thickness based on a coefficient of thermal expansion (CTE) of the substrate layer at a target temperature.

According to a further aspect, the thermionic emission device of the first aspect or any other aspect, wherein, at the predetermined thickness of the insulating layer, the insulating layer comprises a center CTE within a predetermined matching threshold of the CTE of the substrate layer at the target temperature.

According to a further aspect, the thermionic emission device of the first aspect or any other aspect, wherein the beam comprises a length between opposing ends of the beam ranging from greater than 100 micrometers to about 5000 micrometers.

According to a further aspect, the thermionic emission device of the first aspect or any other aspect, wherein the electron emitting layer comprises a thickness of lanthanum hexaboride ($LaB_6$) ranging from about 100 nanometers to about 120 nanometers.

According to a further aspect, the thermionic emission device of the first aspect or any other aspect, wherein the insulating layer comprises silicon dioxide ($SiO_2$), and wherein the $SiO_2$ structurally supports the thickness of $LaB_6$ across the beam length.

According to a second aspect, a thermionic emission device, comprising: A) an electron emitting bridge comprising an upper layer and a lower layer, wherein the upper layer comprises a thickness of a low work function material and the lower layer comprises a thickness of an insulating material, and wherein the thickness of the insulating material structurally supports the thickness of the low work function material across a length of the electron emitting bridge; and B) a substrate material comprising a layer of crystalline silicon (Si) onto which the thickness of the insulating material is deposited, wherein the substrate material comprises an etched cavity between a first end of the electron emitting bridge and a second end of the electron emitting bridge, and wherein the length of the electron emitting bridge is suspended across the etched cavity.

According to a further aspect, the thermionic emission device of the second aspect or any other aspect, wherein the etched cavity is isotropically etched.

According to a further aspect, the thermionic emission device of the second aspect or any other aspect, wherein the low work function material of the upper layer comprises lanthanum hexaboride ($LaB_6$).

According to a further aspect, the thermionic emission device of the second aspect or any other aspect, wherein in response to a particular voltage being applied to the upper layer of the electron emitting bridge at the first end and the second end, the upper layer of the electron emitting bridge is configured to emit electrons in response to reaching an energy threshold corresponding to the low work function material.

According to a further aspect, the thermionic emission device of the second aspect or any other aspect, wherein emitting electrons in response to reaching an energy threshold corresponding to the low work function material comprises anisotropic emission of electrons directed away from both the insulating material and the substrate material.

According to a further aspect, the thermionic emission device of the second aspect or any other aspect, wherein the thickness of the insulating material of the lower layer comprises a predetermined thickness based on a coefficient of thermal expansion (CTE) of the substrate material at a target temperature.

According to a further aspect, the thermionic emission device of the second aspect or any other aspect, wherein, at the predetermined thickness of the lower layer, the insulating material of the lower layer comprises a center CTE within a predetermined matching threshold of the CTE of the substrate material at the target temperature.

According to a further aspect, the thermionic emission device of the second aspect or any other aspect, wherein the length of the electron emitting bridge ranges from greater than 100 micrometers to about 5000 micrometers.

According to a further aspect, the thermionic emission device of the second aspect or any other aspect, wherein the thickness of the low work function material of the upper layer comprises about 100 nanometers to about 120 nanometers of lanthanum hexaboride ($LaB_6$).

According to a further aspect, the thermionic emission device of the second aspect or any other aspect, wherein the insulating material comprises silicon dioxide ($SiO_2$), and wherein the $SiO_2$ structurally supports the thickness of $LaB_6$ across the length of the electron emitting bridge.

These and other aspects, features, and benefits of the claimed invention(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more examples and/or aspects of the disclosure and, together with the written description, serve to explain the principles of the disclosure. Wherever possible, the same reference numbers are used throughout the drawings to refer to the same or like elements of an example, and wherein.

DETAILED DESCRIPTION

Figure 1:
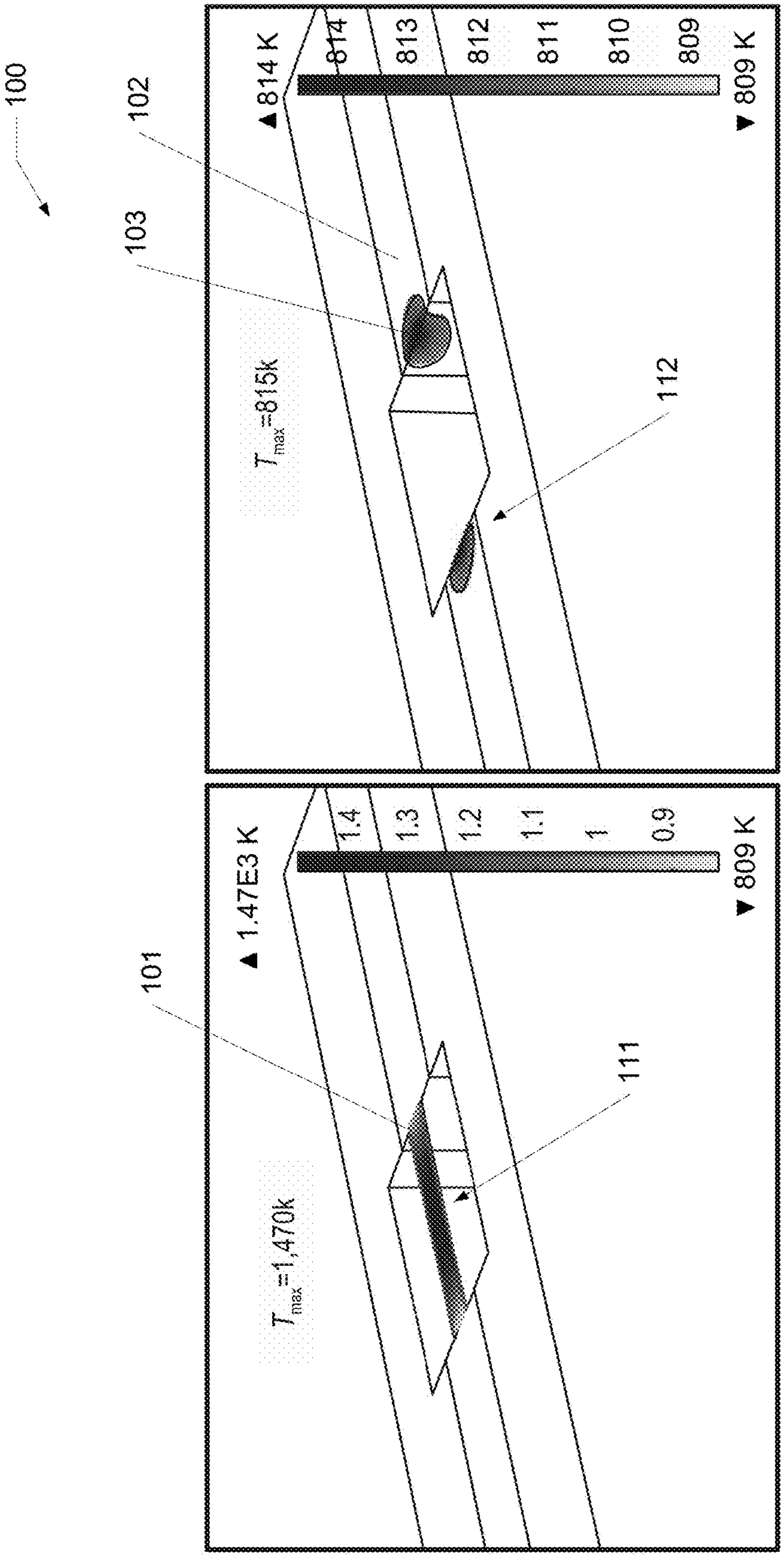
FIG. 1 illustrates a perspective view of a heat map of a thermionic emitter, according to one example of the present disclosure.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the present disclosure illustrated in the drawings and specific language will be used to describe the same. It will, nevertheless, be understood that no limitation of the scope of the disclosure is thereby intended; any alterations and further modifications of the described or illustrated innovation and any further applications of the principles of the disclosure as illustrated therein are contemplated as would normally occur to one skilled in the art to which the disclosure relates. All limitations of scope should be determined in accordance with and as expressed in the claims.

Although specific examples of the present disclosure are explained in detail, it is to be understood that other examples of the present disclosure are contemplated. Accordingly, it is not intended that the disclosure is limited in its scope to the details of constructing and arrangement of components set forth in the following description or illustrated in the drawings. The disclosure is capable of other examples of the present innovation and of being practiced or carried out in various ways.

It must also be noted that, as used in the specification and the appended claims, the singular forms “a”, “an”, and “the” include plural referents unless the context clearly dictates otherwise.

Also, in describing the specific examples of the present disclosure, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from “about” or “approximately” one particular value and/or to “about” or “approximately” another particular value. When such a range is expressed, another example of the disclosure includes from the one particular value and/or to the other particular value.

By “comprising”, “containing”, or “including” is meant that at least the named compound, element, particle or method step is present in the composition or particle or method, but does not exclude the presence of other compounds, materials, particles, method steps, even if the other such compounds, material, particles, method steps have the same function as what is named.

It is also to be understood that mentioning one or more method and/or process steps does not preclude the presence of additional steps or intervening method steps between those steps expressly identified. Similarly, it is also to be understood that mentioning one or more components in a device or system does not preclude the presence of additional components or intervening components between those components expressly identified.

The present disclosure generally relates to miniaturizing multi-layered suspended thermionic electron emitters that are CTE-matched to the supporting substrate and exhibit minimal residual stress. The disclosed system can include a multi-layer thermionic electron emitter. The multi-layer thermionic electron emitter can include a material stack. For example, the material stack can include at least a low-work function material (also referred to herein as a low-work function layer), an insulating material (also referred to herein as an insulating layer), and a substrate. The low-work function material can operate at a target temperature and perform a thermionic emission of electrons. The insulating material can support the low-work function material and include material properties that enhance the thermionic emission of electrons and increase the structural integrity of the multi-layer thermionic electron emitters. The substrate can function as a mechanical support system for the low-work function material and the insulating material.

The material stack of the multi-layered thermionic electron emitter can include the low-work function material fabricated onto an uppermost surface of the insulating material. The insulating material can be fabricated onto an uppermost surface of the substrate. The substrate and portions of the low-work function material and the insulating material can be patterned to form a cavity and one or more beams. The beams can include the low-work function material and the insulating material suspended across the cavity formed into the substrate. The beam can function as a segment of the low-work material and the insulating material that extends continuously across the uppermost surface of the substrate and across the cavity formed in the substrate. The beam can suspended across the cavity in the substrate to achieve a target temperature difference between the low-work function material and the substrate. For example, by suspending the beam over the cavity, the low-work function material can exhibit greater thermal isolation and increase the thermal difference between the low-work function and the substrate. The insulating material can provide structural integrity as the low-work material and the insulating material extends across the cavity.

The insulating material can be selected for its electrical and thermal insulation capabilities and a melting point higher than that of the low-work function material. For example, the insulating material can be selected for its processing compatibilities, including high selectivity during releasing. The insulating material can include a CTE that compensates for the CTE mismatch between the low-work function material and the supporting substrate. By including similar CTE values between the substrate and the insulating material, the insulating material can provide structural integrity to the low-work function material when operating at the target temperature.

The thickness of the insulating material can be optimized to compensate for the CTE mismatch stress in the low-work function material at the target temperature of operation. For example, the thickness of the insulating material can be varied such that the insulating material provides enough support to the low-work function material to accommodate for CTE mismatch stresses.

The low-work function material is patterned to achieve the target temperature of operation. For example, the low-work function material can be patterned to create a particular beam design. The particular beam design can define one or more particular lengths, thicknesses, depths, and/or shapes of the beam. The temperature of operation can vary linearly with variations to the particular beam design. The particular beam design can be patterned into the low-work function material to achieve a desired target temperature of operation.

A top side of the multi-layered thermionic electron emitter can emit electrons at the target temperature of operation. For example, the insulating material can limit the amount of electron emission towards the insulating material and the substrate. The insulating material can limit the number of electrons emitted from a bottom side of the low-work function material toward the substrate. By limiting the number of electrons emitted towards the substrate, the insulating material can reduce the NSC effect and increase the flux of emitted electrons.

In various examples, independent multi-layered thermionic electron emitters of varying dimensions are fabricated in an array to circumvent the failure of any one multi-layered thermionic electron emitter. For example, one or more beams can be patterned into the multi-layered thermionic electron emitter to circumvent the failure of any one of the beams in the multi-layered thermionic electron emitter.

Example Embodiments

Referring now to the figures, for the purposes of example and explanation of the fundamental processes and components of the disclosed apparatuses, systems, and methods, reference is made to FIG. 1, which illustrates a heat map 100 of an example thermionic emitter. As will be understood and appreciated, the example shown in FIG. 1 represents merely one approach or example of the present disclosure, and other aspects are used according to various examples of the present disclosure.

The heat map 100 can illustrate one or more heat distributions for various components of the thermionic emitter. The heat map 100 can demonstrate how heat transfers between a bridge 101 and a first substrate 102. During operation, the thermionic emitter can heat the bridge 101, which causes heat to transfer from the bridge 101 to the first substrate 102. The heat transferred from the bridge 101 to the first substrate 102 can cause structural issues for the thermionic emitter. Accordingly, the following description set forth immediately below can discuss the functionalities of the thermionic emitter and how the structural issues may present themselves in particular scenarios.

The thermionic emitter can be a system that emits electrons when heated to a target temperature of operation. The thermionic emitter can include the bridge 101 and the first substrate 102. The bridge 101 can extend across the first substrate 102. The bridge 101 can release electrons through thermionic emission when heated to the target temperature of operation. For example, the bridge 101, manufactured using Lanthanum hexaboride ($LaB_6$) and having a length of 120 microns, a width of 20 microns, and a thickness of 100 microns, can perform thermionic emission of electrons when a voltage of 0.4-volts is applied through the bridge 101. When applying the voltage of 0.4-volts across the bridge 101, the bridge 101 can heat to the target temperature of operation of approximately 1470K. The bridge 101 can include a temperature distribution 111, where the temperature can be maximized at the center of the bridge 101.

The substrate can include one or more contact points 103. The one or more contact points 103 can define locations on the first substrate 102 where the bridge 101 comes in contact with the first substrate 102. When the bridge 101 reaches the target temperature of operation, the heat exerted by the bridge 101 can partially transfer to the first substrate 102 at the contact points 103. The contact points 103 can exhibit a second heat distribution 112, where the heat is maximized at the center of the contact points 103. The heat exerted into the first substrate 102 at the contact points 103 can include a temperature value upwards of 815K. At such high operating temperatures, the first substrate 102 can exhibit structural issues. For example, for a Borosilicate substrate, the strain point can measure 783.15K. The strain point can define the maximum temperature at which a material can operate for structural applications without undergoing creep (a gradual structural deformation). As the heat exerted by the bridge 101 transfers to the first substrate 102, the heat exerted into the first substrate 102 can surpass one or more structural thresholds (e.g., strain point, annealing point, sag point, transformation point). As the heat surpasses one or more of the structural thresholds, the structural integrity of the first substrate 102 can fail.

Figure 2:
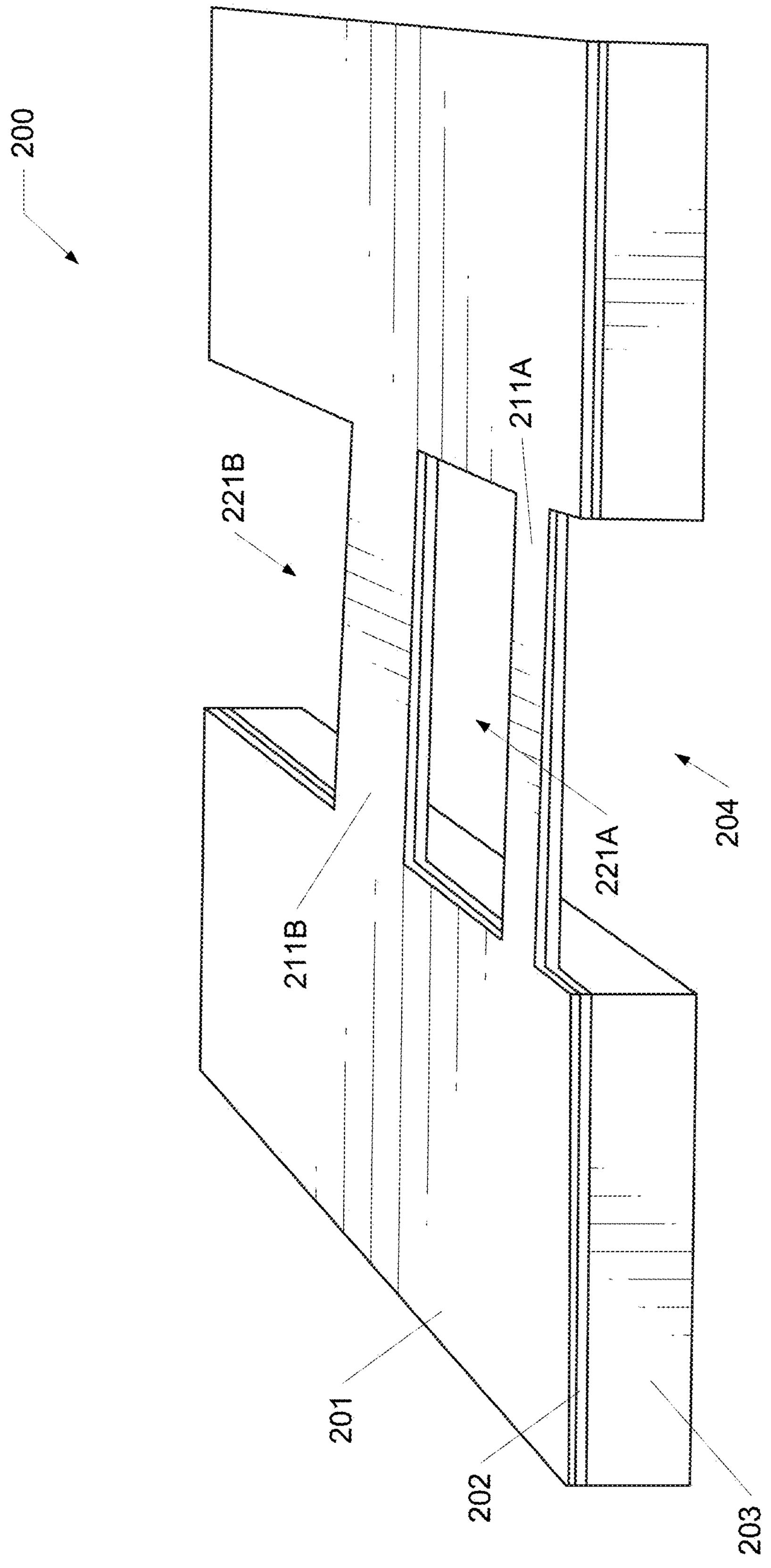
FIG. 2 illustrates a perspective view of one or more multi-layered thermionic electron emitters, according to one example of the present disclosure.

Referring now to FIG. 2, illustrated is a perspective view of one or more multi-layered thermionic electron emitters 200, according to one example of the present disclosure. The multi-layered thermionic emitters 200 can perform similar functionalities to the thermionic emitters discussed in FIG. 1. The multi-layered thermionic emitters 200 can include an insulating material to increase the structural integrity of the multi-layered thermionic emitters 200 and increase the thermal and electrical isolation between a low-work function material and a substrate. For example, the insulating material present in the multi-layered thermionic emitters 200 can correct many of the structural issues, among other issues, present in the thermionic emitters that lack an insulating material.

The multi-layered thermionic emitters 200 can perform thermionic emission of electrons. For example, a voltage can be applied across the multi-layered thermionic emitter 200. Further continuing this example, the voltage applied across the multi-layered thermionic emitter 200 can heat the multi-layered thermionic emitter 200, allowing (or causing) electrons to release from the surface of the multi-layered thermionic emitter 200.

The multi-layered thermionic emitters 200 can include a material stack. The material stack can include an electron emitting layer 201, an insulating layer 202, and a substrate 203. Using the material stack for the multi-layered thermionic emitters 200 can increase the thermal isolation and electrical isolation between the electron emitting layer 201 and the substrate 203. For example, by placing the insulating layer 202 in between the electron emitting layer 201 and the substrate 203, the insulating layer 202 can reduce the amount of heat transferred from the electron emitting layer 201 to the substrate 203. In another example, the insulating layer 202 can increase electrical isolation by reducing the amount of current flowing between the electron emitting layer 201 and the substrate 203. In another example, the insulating layer 202 can restrict the number of electrons released from the electron emitting layer 201 towards the substrate 203. Further continuing this example, the insulating layer 202 can promote the thermionic emission of electrons from the electron emitting layer 201 in a direction opposite from the substrate 203.

The material stack can increase the structural integrity of the multi-layered thermionic emitters 200. For example, the Coefficient of Thermal Expansion (CTE) can be matched between the insulating layer 202 and the substrate 203. Continuing this example, matching the CTE values of the insulating layer 202 and the substrate 203 can reduce the thermal stresses on both the electron emitting layer 201 and the substrate 203 when the electron emitting layer 201 operates at the target temperature of operation. The insulating layer 202 can allow the electron emitting layer 201 to operate at the target temperature of operation without breaking off from the substrate due to thermal stresses.

The electron emitting layer 201 can include a polycrystalline low-work function material and/or any particular material that releases electrons when heated to the target temperature of operation. The work function of a material can be defined as the thermodynamic work necessary to release one electron from the surface of the material to a point in a vacuum immediately outside the surface of the material. For example, the electron emitting layers 201 can include a material with a work function less than 4 eV (e.g., $\phi_0<4$ eV). The material used for the electron emitting layer 201 can include but is not limited to $LaB_6$. The target temperature of operation for $LaB_6$ can be greater than 1470K.

The insulating layer 202 can include any particular material that insulates the substrate 203 electrically, electronically, and thermally from the electron emitting layer 201. The insulating layer 202 can include but is not limited to Silicon dioxide ($SiO_2$), Silicon Nitride (SiN), Zirconium dioxide ($ZrO_2$), and/or any other material that functions to support the electron emitting layer 201 and the substrate 203. Referring now to TABLE 1. TABLE 1 includes a list of possible materials for the insulating layer 202.

TABLE 1 illustrates various insulating materials and their corresponding properties

| Insulating Material | Melting point (° C.) | CTE (° C.-1) | E (Pa) | v | Target Thickness (m) | Center CTE (° $C^{-1}$) |
|---|---|---|---|---|---|---|
| $LaB_6$ | 2,210 | 8.80E−06 | 4.74E+11 | 0.2 | 1.00E-07 | — |
| $SiO_2$ | 1710 | 5.00E−07 | 6.63E+10 | 0.15 | 5.00E-06 | 1.28E−06 |
| SIN | 1900 | 3.30E−06 | 3.10E+11 | 0.27 | 3.00E-06 | 3.51E−06 |
| $Al_2O_3$ | 2072 | 8.10E−06 | 3.00E+11 | 0.21 | NA | NA |
| $ZrO_2$ | 2715 | 2.30E−06 | 1.00E+11 | 0.22 | 5.00E-06 | 2.74E−06 |
| $TiO_2$ | 1843 | 8.40E−06 | 2.30E+11 | 0.27 | NA | NA |
| $HfO_2$ | 2758 | 6.00E−06 | 5.70E+10 | 0.31 | NA | NA |

The insulating materials with melting points greater than the target temperature of operation (e.g., 800° C.) can be selected for potential use as the insulating layer 202. The insulating materials with melting points greater than the target temperature of operation can be further narrowed by selecting the insulating materials with CTE values that are less than the CTE value of the substrate 203. For example, the CTE value of silicon (Si) can be measured to be about 4 ppm/K; however, silicon's CTE can increase or decrease based on temperature. Continuing this example, $SiO_2$, SiN, and $ZrO_2$ can include center CTE values (the CTE as measured at the center point of the material thickness) lower than the CTE value of the Si substrate 203. The CTE of the insulating layer 202 can vary based on the thickness of the insulating layer. For example, the thickness of the insulating layer 202 can be optimized such that the CTE value of the insulating layer 202 matches the CTE of the substrate. The thickness of the insulating layer 202 can be optimized by using one or more calculations involving the Young's modulus value and the Poisson Ratio.

The substrate 203 can include various materials such as, but not limited to Borosilicate glass, Si, and/or a SD-2 glass substrate manufactured by the HOYA GROUP.

The substrate 203 can include the cavity 204. The multi-layered thermionic emitter 200 can include one or more beams 211A-B extending across the cavity 204. The cavity 204 and the beams 211A-B can be formed through various microfabrication techniques. For example, the substrate 203 can include a first etching 221A and a second etching 221B. The first etching 221A and the second etching 221B can define two or more locations etched into the substrate 203. The first etching 221A and the second etching 221B can be areas on the top surface of the electron emitting layer 201 not shielded by photoresist during patterning, such that those areas are removed during etching. The first etching 221A and the second etching 221B can be etched through both the electron emitting layer 201 and the insulating layer 202, and the etchings can combine to form the cavity 204 in the substrate layer 203, thereby isolating the one or more beams 211A-B. The first etching 221A and the second etching 221B can be formed into the substrate 203 by patterning a photoresist and/or hardmask on the substrate 203 at locations excluding the locations of the first etching 221A and the second etching 221B. The substrate 203 can subsequently be patterned at the locations of the first etching 221A and the second etching 221B. The substrate 203 can be patterned through isotropic etching techniques, anisotropic etching techniques, and/or photolithographic etching techniques. For example, the first etching 221A and the second etching 221B can be formed via isotropically etching the Si substrate using Xenon Difluoride ($XcF_2$) or isotropically etching a glass substrate using Hydrogen fluoride (HF). During the etching process, the first etching 221A and the second etching 221B can merge and combine to isolate the beams 211A-B, thus forming the cavity 204. For example, the beam 211B can define an unetched region oriented between the first etching 221A and the second etching 221B. The multi-layered thermionic emitter 200 can include two or more etchings 221A-B to form two or more beams 211A-B.

The beams 211A-B can function as the electron-emitting source of the multi-layered thermionic emitter 200. For example, a voltage can be applied across the electron emitting layer 201 extending across the beams 211A-B. The voltage can increase the temperature of the electron emitting layer 201 such that the electron emitting layer 201 reaches the target temperature of operation. Extending the beams 211A-B across the cavity 204 can increase the thermal isolation between the electron emitting layer 201 and the substrate 203 by decreasing the contact between the electron emitting layer 201 and the substrate 203. The insulating material 202 can provide structural support such that the electron emitting layer 201 of the beams 211A-B do not crack, twist, or break when extending across the cavity 204.

The beams 211A-B can be patterned to include a particular beam design. The particular beam design can define one or more dimensions for the beams 211A-B (e.g., width, depth, height, length, shape and/or volume), where the dimensions of the beam design can be optimized to achieve the target temperature of operation. For example, the target temperature of operation of the electron emitting layer 201 can vary linearly with variations to the particular beam design. The particular beam design can be patterned into the electron emitting layer 201 to achieve the desired target temperature of operation. By varying the particular beam design of the beams 211A-B, the beams 211A-B can exhibit varying degrees of electrical resistivity. Varying the electrical resistivity of the beams 211A-B can affect the target temperature of operation. The beams 211A-B can include a characteristic length ranging between 10 μm and 10 cm, where the characteristic length can define the length of the one or more beams 211A-B.

Figure 3:
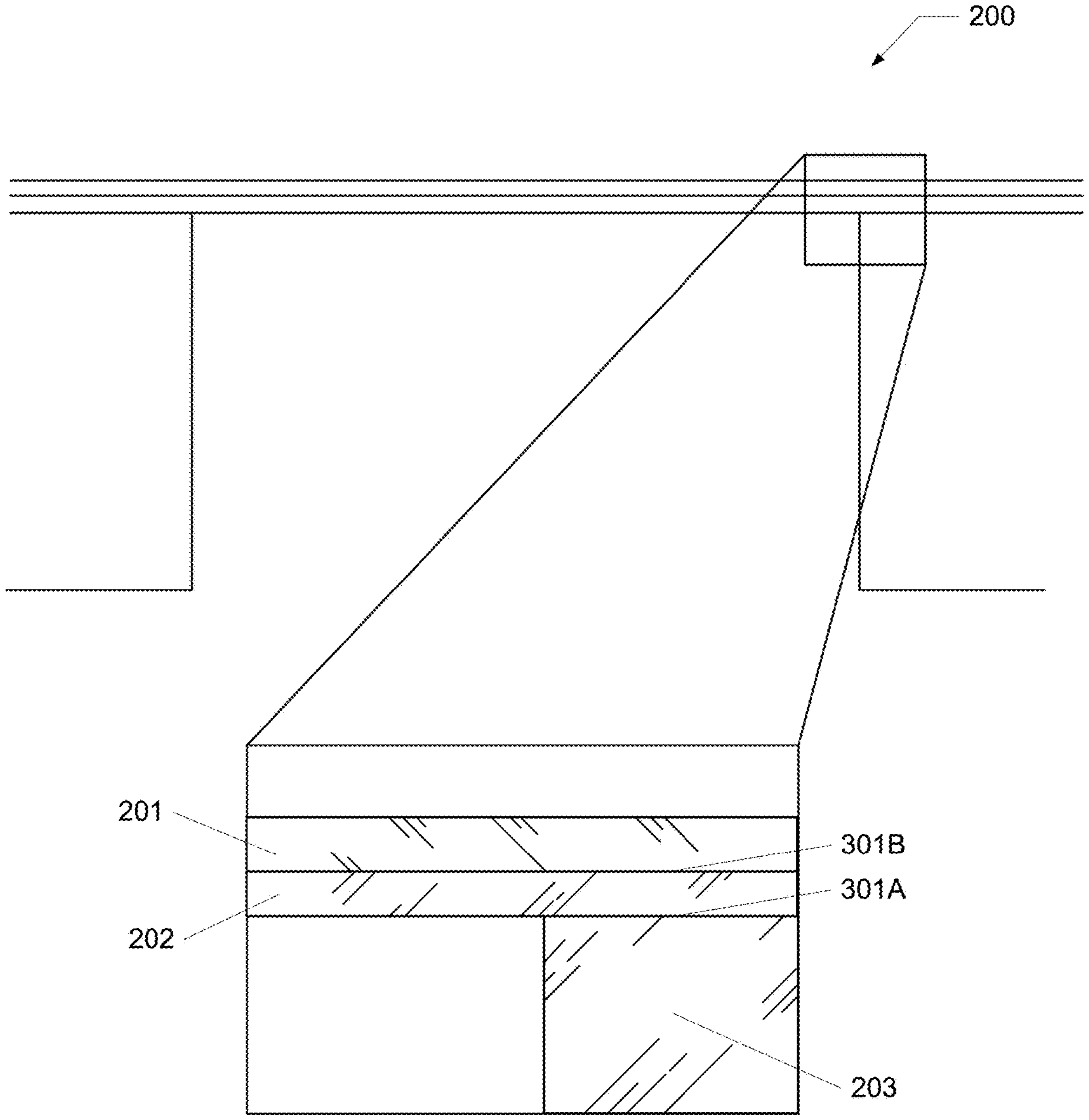
FIG. 3 illustrates a cross-section side view of the multi-layered thermionic emitter, according to one example of the present disclosure.

Referring now to FIG. 3, illustrated is a cross-section view of the multi-layered thermionic emitter 200, according to one example of the present disclosure. The insulating layer 202 can be deposited onto an uppermost surface 301A of the substrate 203. For example, the insulating layer 202 can be evaporated, deposited, and/or applied onto the uppermost surface 301A of the substrate 203 using any other suitable technique. The electron emitting layer 201 can be fabricated on an uppermost surface 301B of the insulating layer 202. For example, the low-work function layer 202 can be evaporated, deposited, and/or applied onto the uppermost surface 301B of the insulating layer 202 using any other suitable technique.

Referring again to TABLE 1, TABLE 1 may illustrate the optimal thickness for each insulating material, assuming the electron emitting layer 201 is $LaB_6$ and the $LaB_6$ thickness is 100 nm. In another example, introducing a 75 nm thick insulating layer 202 (made from $SiO_2$) between a 120 nm thick electron emitting layer 201 (made from $LaB_6$) and a particular substrate 203 can reduce the tensile stress of the multi-layered thermionic emitter 200 by at least 60%, 60-100%, 60-80%, 80%, 80-100%, or less than 100%. Any particular combination of thicknesses can be used as long as the CTE value of the insulating layer 202 matches with the CTE value of the substrate 203, the thicknesses are selected to adequately adjust for the target temperature of operation, and the insulating layer 202 adequately performs thermal isolation, electrical isolation, and structural support for the multi-layered thermionic emitter 200. The electron emitting layer 201 can include a thickness of at least 100 nanometers, 100-120 nanometers, or less than 120 nanometers.

Figure 4:
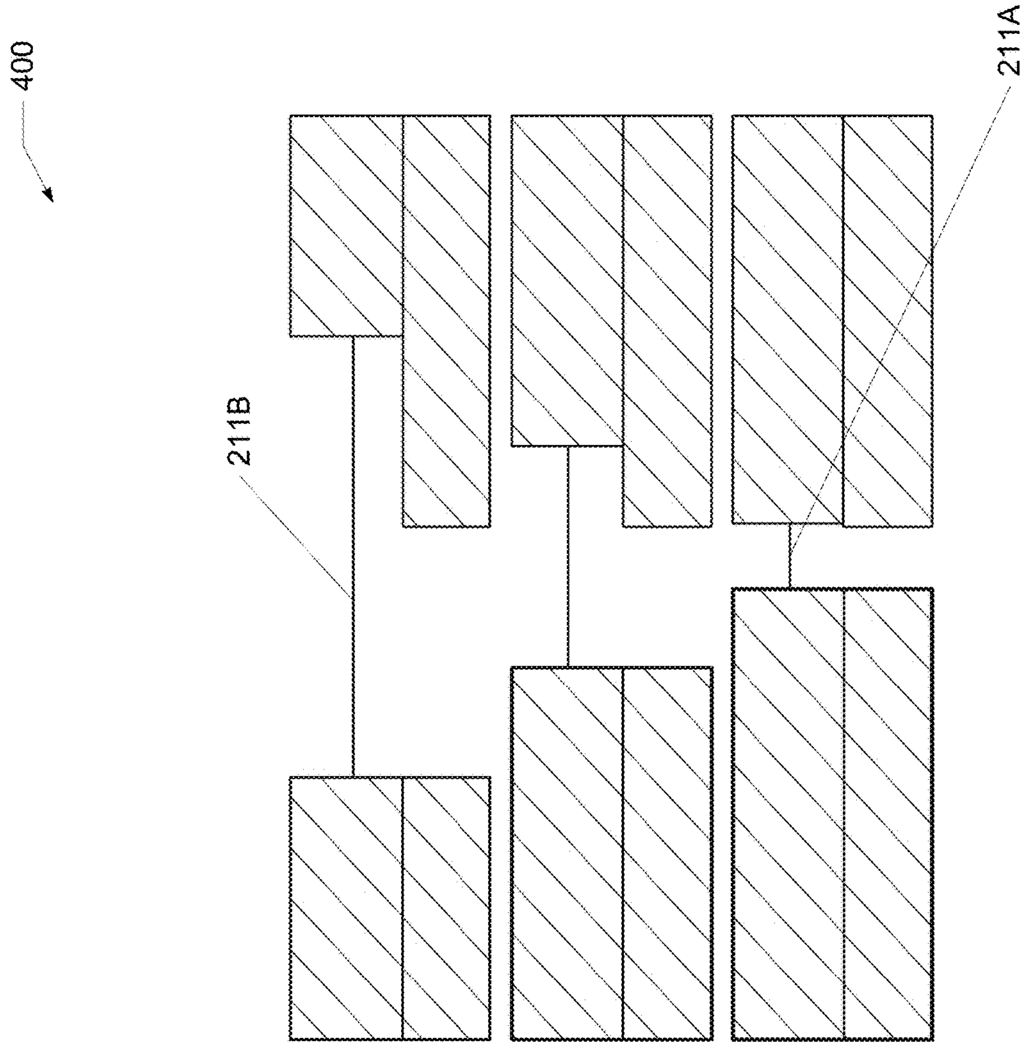
FIG. 4 illustrates one or more multi-layered thermionic electron emitters manufactured in an array, according to one example of the present disclosure.

Referring now to FIG. 4, illustrated is one or more multi-layered thermionic electron emitters 200 manufactured in an array 400, according to one example of the present disclosure. The one or more multi-layered thermionic emitters 200 can be manufactured in the array 400 to circumvent the failure of any one multi-layered thermionic electron emitter 200. For example, the array can include two or more beams 211A-B such that if a first beam 211A fails (e.g., breaks) the second beam 211B can compensate for the lost first beam 211A. The beams 211A-B and/or any other beam from the array 400 can have a length measuring at least about 100 μm (micrometers, or microns), and the length can measure as long as about 5000 μm without succumbing to internal or external forces, such as residual stress, thermal stress, strain or deflection from loads, etc. For example, the beam 211A can measure 100 μm and the beam 211B can measure 2000 μm (or another length, such as about 5000 μm). The length of the beams (e.g., the beams 211A-B) in the array 400 can be dependent upon the width and thickness of one or more beams. For example, the length ranging from about 100 μm to 5000 μm can correspond to a width of 80 μm and a depth of 0.9 μm.

The foregoing description of the example examples has been presented only for the purposes of illustration and description and is not intended to be exhaustive or to limit the inventions to the precise forms disclosed. Many modifications and variations are possible in light of the above teaching.

The examples were chosen and described in order to explain the principles of the inventions and their practical application so as to enable others skilled in the art to utilize the inventions and various examples and with various modifications as are suited to the particular use contemplated. Alternative examples will become apparent to those skilled in the art to which the present inventions pertain without departing from their spirit and scope.

What is claimed is:

1. A thermionic emission device, comprising:

a substrate layer;

an insulating layer deposited onto an uppermost surface of the substrate layer; and an electron emitting layer deposited onto an uppermost surface of the insulating layer, wherein a particular portion of the electron emitting layer and a particular portion of the insulating layer comprise a beam suspended across a cavity in the substrate layer.

2. The thermionic emission device of claim 1, wherein the cavity is formed by isotropically etching a first etching and a second etching in the substrate layer, the insulating layer, and the electron emitting layer, and wherein the first etching and the second etching converge to form the cavity in the substrate layer.

3. The thermionic emission device of claim 1, wherein the electron emitting layer comprises a polycrystalline-structured low work function material.

4. The thermionic emission device of claim 3, wherein in response to a particular voltage being applied to opposing ends of the beam, the particular portion of the electron emitting layer is configured to emit electrons in response to reaching an energy threshold corresponding to the low work function material.

5. The thermionic emission device of claim 4, wherein emitting electrons in response to reaching the energy threshold corresponding to the low work function material comprises anisotropic emission of electrons directed away from both the insulating layer and the substrate layer.

6. The thermionic emission device of claim 1, wherein the insulating layer comprises a predetermined thickness based on a coefficient of thermal expansion (CTE) of the substrate layer at a target temperature.

7. The thermionic emission device of claim 6, wherein, at the predetermined thickness of the insulating layer, the insulating layer comprises a center CTE within a predetermined matching threshold of the CTE of the substrate layer at the target temperature.

8. The thermionic emission device of claim 1, wherein the beam comprises a length between opposing ends of the beam ranging from greater than 100 micrometers to about 5000 micrometers.

9. The thermionic emission device of claim 8, wherein the electron emitting layer comprises a thickness of lanthanum hexaboride ($LaB_6$) ranging from about 100 nanometers to about 120 nanometers.

10. The thermionic emission device of claim 9, wherein the insulating layer comprises silicon dioxide ($SiO_2$), and wherein the $SiO_2$ structurally supports the thickness of $LaB_6$ across the beam length.

11. A thermionic emission device, comprising:

an electron emitting bridge comprising an upper layer and a lower layer, wherein the upper layer comprises a low work function material and the lower layer comprises an insulating material; and a substrate material comprising a layer of crystalline silicon (Si) onto which the insulating material is deposited, wherein the substrate material comprises an etched cavity between a first end of the electron emitting bridge and a second end of the electron emitting bridge, and wherein a length of the electron emitting bridge is suspended across the etched cavity.

12. The thermionic emission device of claim 11, wherein the etched cavity is isotropically etched.

13. The thermionic emission device of claim 11, wherein the low work function material of the upper layer comprises lanthanum hexaboride ($LaB_6$).

14. The thermionic emission device of claim 11, wherein in response to a particular voltage being applied to the upper layer of the electron emitting bridge at the first end and the second end, the upper layer of the electron emitting bridge is configured to emit electrons in response to reaching an energy threshold corresponding to the low work function material.

15. The thermionic emission device of claim 14, wherein emitting electrons in response to reaching an energy threshold corresponding to the low work function material comprises anisotropic emission of electrons directed away from both the insulating material and the substrate material.

16. The thermionic emission device of claim 11, wherein a thickness of the insulating material of the lower layer comprises a predetermined thickness based on a coefficient of thermal expansion (CTE) of the substrate material at a target temperature.

17. The thermionic emission device of claim 16, wherein, at the predetermined thickness of the lower layer, the insulating material of the lower layer comprises a center CTE within a predetermined matching threshold of the CTE of the substrate material at the target temperature.

18. The thermionic emission device of claim 11, wherein the length of the electron emitting bridge ranges from greater than 100 micrometers to about 5000 micrometers.

19. The thermionic emission device of claim 18, wherein a thickness of the low work function material of the upper layer comprises about 100 nanometers to about 120 nanometers of lanthanum hexaboride ($LaB_6$).

20. The thermionic emission device of claim 19, wherein the insulating material comprises silicon dioxide ($SiO_2$), and wherein the $SiO_2$ structurally supports the thickness of $LaB_6$ across the length of the electron emitting bridge.

* * * * *